(12) United States Patent
Chen

(10) Patent No.: US 11,039,080 B2
(45) Date of Patent: Jun. 15, 2021

(54) CONTROL METHOD AND PROCESSING APPARATUS

(71) Applicant: LENOVO (BEIJING) LIMITED, Beijing (CN)

(72) Inventor: Jiefeng Chen, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 16/627,468

(22) PCT Filed: Dec. 8, 2017

(86) PCT No.: PCT/CN2017/115226
§ 371 (c)(1),
(2) Date: Dec. 30, 2019

(87) PCT Pub. No.: WO2019/000848
PCT Pub. Date: Jan. 3, 2019

(65) Prior Publication Data
US 2020/0329186 A1     Oct. 15, 2020

(30) Foreign Application Priority Data

Jun. 30, 2017   (CN) .......................... 201710526821.2

(51) Int. Cl.
*H04N 5/235*     (2006.01)
*H04N 5/369*     (2011.01)

(52) U.S. Cl.
CPC ......... *H04N 5/2354* (2013.01); *H04N 5/2352* (2013.01); *H04N 5/369* (2013.01)

(58) Field of Classification Search
CPC combination set(s) only.
See application file for complete search history.

(56) References Cited

U.S. PATENT DOCUMENTS

| 9,154,708 | B1 * | 10/2015 | Rivard | H04N 5/3559 |
| 2004/0179832 | A1 | 9/2004 | Okabe | |
| 2011/0122301 | A1 | 5/2011 | Yamura et al. | |
| 2016/0142603 | A1 * | 5/2016 | Chen | H04N 5/2354 348/371 |
| 2016/0360124 | A1 * | 12/2016 | Shan | H04N 9/04559 |

FOREIGN PATENT DOCUMENTS

| CN | 102427509 A | 4/2012 |
| CN | 102932603 A | 2/2013 |
| CN | 104660898 A | 5/2015 |

(Continued)

OTHER PUBLICATIONS

The World Intellectual Property Organization (WIPO) International Search Report for PCT/CN2017/115226 dated Mar. 21, 2018 5 Pages (including translation).

*Primary Examiner* — Daniel M Pasiewicz
(74) *Attorney, Agent, or Firm* — Anova Law Group, PLLC

(57) ABSTRACT

Embodiments of the present disclosure provides a method, including: obtaining an output time of an image being taken by an image capturing apparatus; obtaining an exposure time of the image being taken by an image capturing apparatus; and based on the output time and the exposure time, controlling a turn-on time of a flash corresponding to the image being taken by the image capturing apparatus.

18 Claims, 3 Drawing Sheets

---

Obtaining output time information of an image, where the output time information represents time information of a target image output by an image capturing apparatus when the image capturing apparatus is capturing a target object — 301

Obtaining exposure time information of the image, where the exposure time information represents exposure time information of the image capturing apparatus when the image capturing apparatus is capturing the target object — 302

Based on the output time information and the exposure time information, generating turn-on time information for controlling the flash to be in an operating state, and the turn-on time information represents time information of the flash being turned on to the operating state when the image capturing apparatus is capturing a target object — 303

Outputting the turn-on time information, so that the flash is in an operating state within a time period corresponding to the turn-on time information — 304

(56) References Cited

FOREIGN PATENT DOCUMENTS

| | | |
|---|---|---|
| CN | 104702850 A | 6/2015 |
| CN | 204761557 U | 11/2015 |
| CN | 105657284 A | 6/2016 |
| CN | 105723697 A | 6/2016 |
| CN | 107205126 A | 9/2017 |
| JP | 2005234014 A | 9/2005 |

\* cited by examiner

CONTROL METHOD AND PROCESSING APPARATUS

CROSS-REFERENCES TO RELATED APPLICATIONS

This application is a national phase entry under 35 U.S.C. § 371 of PCT Patent Application No. PCT/CN2017/115226, filed on Dec. 8, 2017, which claims priority Chinese Patent Application No. 201710526821.2, filed with the China National Intellectual Property Administration on Jun. 30, 2017, the entire contents of both of which are incorporated herein by reference.

TECHNICAL FIELD

The present disclosure relates to the field of control technology and, more particularly, to a control method and processing apparatus.

BACKGROUND

Nowadays, more and more applications of flash appear in mobile terminals such as mobile phones and tablets. However, the flash in an existing mobile terminal, when being used as a flash for taking photos, has the following problems. If a brightness setting of the flash is relatively low, the captured photo may be unclear; whereas if the brightness setting is relatively high, the flash may irritate the eyes of the subject. In addition, since the existing mobile terminal is not provided with a mechanical shutter, in order to ensure that the light emitted by the flash can be captured by a camera chip, the duration of turning on the flash is prolonged, which further aggravates the eyes of the subject and reduces user experience.

SUMMARY

To solve existing technical problems, embodiments of the present disclosure provides a control method and a processing apparatus A first aspect of embodiments of the present disclosure provides a control method. The method includes: obtaining output time information of an image, the output time information representing information about an output time of a target image outputted by an image capturing apparatus when the image capturing apparatus is capturing a target object; obtaining exposure time information of the image, the exposure time information representing information about an exposure time of the image capturing apparatus when the image capturing apparatus is capturing the target object; based on the output time information and the exposure time information, generating turn-on time information for controlling a flash to be in an operating state, the turn-on time information representing information about a time of the flash being turned on to the operating state when the image capturing apparatus is capturing the target object; and outputting the turn-on time information, so that the flash is in the operating state during a time period corresponding to the turn-on time information.

Optionally, the time period corresponding to the turn-on time information belongs to a first time period of an interval between two neighboring frames of the target image, and belongs to a second time period from before an ending of a first row of an image frame to after a beginning of a last row of the image frame.

Optionally, based on the output time information and the exposure time information, generating turn-on time information for controlling the flash to be in the operating state comprises: inputting the output time information and the exposure time information to a logic gate circuit of the image capturing apparatus; and generating the turn-on time information by using the logic gate circuit.

Optionally, the logic gate circuit includes at least a logic AND gate; correspondingly, inputting the output time information and the exposure time information to the logic gate circuit of the image capturing apparatus, and generating the turn-on time information through the logic gate circuit comprises: inputting the output time information obtained from a photosensitive component to the logic AND gate, and inputting the exposure time information obtained from an image output interface to the logic AND gate; identifying, by using the logic AND gate, a lesser one of the exposure time information and the output time information, to obtain a target time range belonging to both a time period corresponding to the exposure time information and a time period corresponding to the output time information; and determining the turn-on time information from the target time range.

Optionally, outputting the turn-on time information comprises: outputting a pulse signal of the turn-on time information using a pin of the image capturing apparatus, so that the flash is in the operating state during the time period corresponding to the turn-on time information.

A second aspect of embodiments of the present disclosure provides a processing apparatus. The apparatus includes: an image capturing component configured to obtain output time information of an image, the output time information representing information about an output time of a target image outputted by an image capturing apparatus when the image capturing apparatus is capturing a target object; obtain exposure time information of the image, the exposure time information representing information about an exposure time of the image capturing apparatus when the image capturing apparatus is capturing the target object; and a processor configured to, based on the output time information and the exposure time information, generate turn-on time information for controlling a flash to be in an operating state, the turn-on time information representing information about a time of the flash being turned on to the operating state when the image capturing apparatus is capturing the target object. Correspondingly, the image capturing component is further configured to output the turn-on time information, so that the flash is in the operating state during a time period corresponding to the turn-on time information.

Optionally, the time period corresponding to the turn-on time information belongs to a first time period of an interval between two neighboring frames of the target image, and belongs to a second time period from before an ending of a first row of an image frame to after a beginning of a last row of the image frame.

Optionally, the processor is further configured to: input the output time information and the exposure time information to a logic gate circuit of the image capturing apparatus; and generate the turn-on time information by using the logic gate circuit.

Optionally, the logic gate circuit includes at least a logic AND gate; correspondingly, the processor is further configured to: input the output time information obtained from a photosensitive component to the logic AND gate, and input the exposure time information obtained from an image output interface to the logic AND gate; identify, by using the logic AND gate, a lesser one of the exposure time information and the output time information, to obtain a target time range belonging to both a time period corresponding to the exposure time information and a time period corresponding to the output time information; and determine the turn-on time information from the target time range.

Optionally, the image capturing component is further configured to: output a pulse signal of the turn-on time information using a pin of the image capturing apparatus, so that the flash is in the operating state during the time period corresponding to the turn-on time information.

A third aspect of embodiments of the present disclosure provides a processing apparatus, including at least: a processor and a memory configured to store a computer program executable on the processor, where the processor is configured to, when executing the computer program, perform steps of the method described above.

A fourth aspect of the embodiments of the present disclosure provides a computer-readable storage medium having stored thereon a computer program, and when the computer program is executed by a processor, the steps of the method described above are implemented.

In the control method and processing apparatus provided by embodiments of the present disclosure, when an image capturing apparatus is capturing a target object, the output time information of the image and the exposure time information of the image are used to determine the turn-on time information for controlling the flash to be in an operating state. Since the turn-on time information is determined based on the output time information and the exposure time information, the determined turn-on time information can be controlled to be within time periods corresponding to the output time information and the exposure time information, so as to lay a foundation for shortening the turn-on time of the flash, thereby avoiding the problem of uneven brightness caused by the flash being turned on for a long time, and enhancing the user experience.

BRIEF DESCRIPTION OF THE DRAWINGS

Based on the following description of exemplary embodiments with reference to exemplary drawings, other details, aspects, and advantages of the present disclosure will become apparent. In the exemplary drawings.

DETAILED DESCRIPTION OF THE EMBODIMENTS

Figure 1:
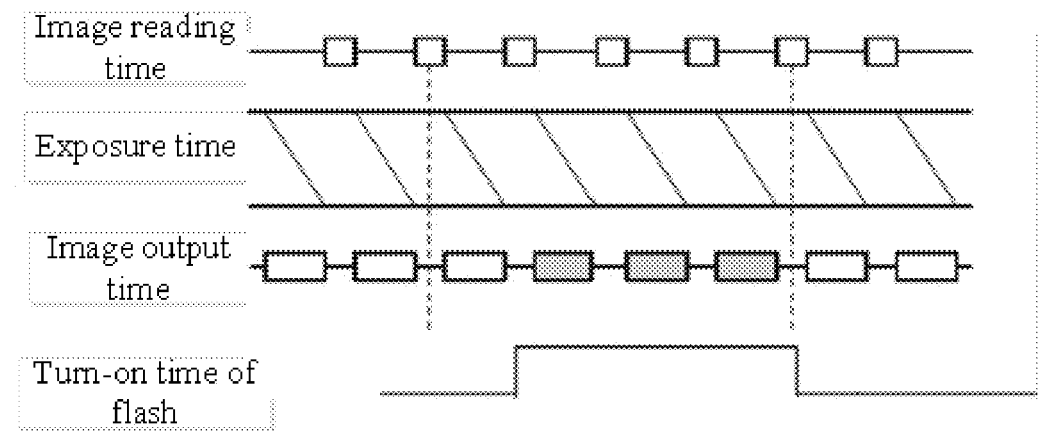
FIG. 1 schematically illustrates a timing diagram of controlling a flash in a mobile phone in prior art.
Figure 2:
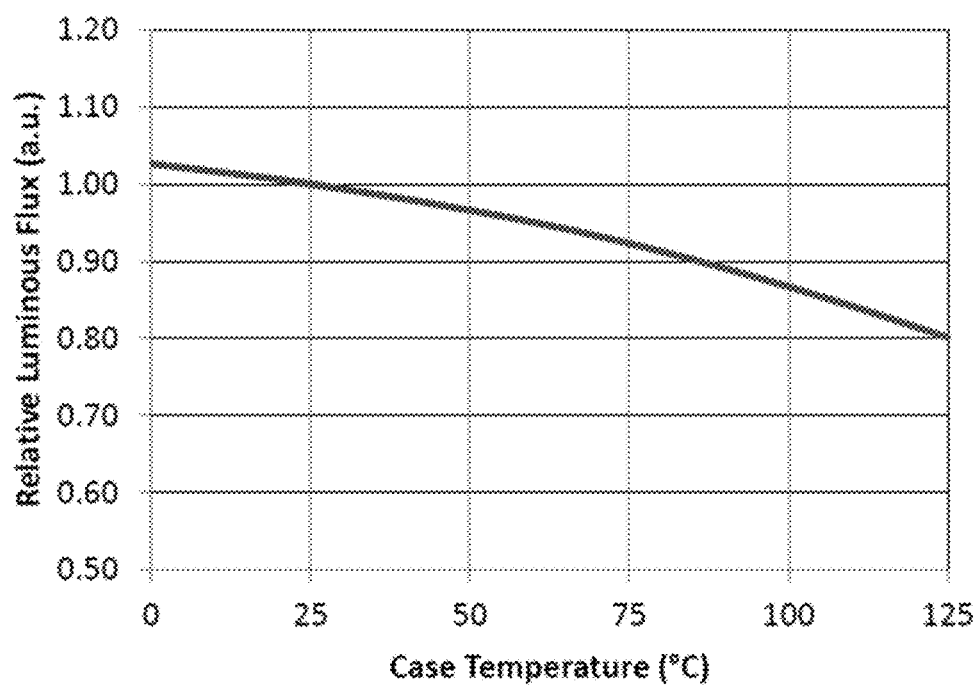
FIG. 2 schematically illustrates a relationship chart where brightness of a flash changes in accordance with temperature change.

In order to ensure that a light of a flash can be captured by a camera chip in a mobile phone, in the prior art, a turn-on time of the flash is generally prolonged. For example, as shown in FIG. 1, a turn-on duration of a flash covers the time for taking 3 frames of images. Further, the three frames of images are completely exposed, and a best image may be selected from the three frames of images for output. In this way, the light-on time of the flash is usually about 200 ms. In addition, as the flash is turned on for an extended period of time, its temperature increases accordingly. FIG. 2 is a schematic diagram of the relationship between the brightness of the flash and the temperature. From the diagram shown in FIG. 2, it can be seen that the brightness decreases as the temperature increases. That is to say, the existing method of turning on the flash to shoot three frames of images can cause the brightness of the flash to decrease, that is, problems of different brightness and uneven brightness can occur in the three frames of images, making it difficult to select the best image from the three frames of images. Therefore, in order to solve the above problems, embodiments of the present disclosure provide a control method and a processing apparatus. Technical solutions of the present disclosure will be described with reference to the drawings. The accompanying drawings are for reference only and are not intended to limit the present disclosure. It will be appreciated that the described embodiments are merely exemplary and are not intended to limit the scope of the disclosure. In addition, in the following description, descriptions of well-known structures and technologies are omitted to avoid unnecessarily obscuring the concepts of the present disclosure.

As used herein, the terms "including", "comprising", and the like indicate the presence of stated features, steps, operations, and/or components, but do not preclude the presence or addition of one or more other features, steps, operations, or component.

All terms (including technical and scientific terms) used herein have the meaning commonly understood by those skilled in the art unless otherwise defined. It should be noted that the terms used herein should be interpreted to have meanings consistent with the context of this specification, and should not be interpreted in an idealized or overly rigid manner.

In the case of using an expression similar to "at least one of A, B, and C", it should generally be interpreted according to the meaning commonly understood by those skilled in the art (for example, "a system having at least one of A, B, or C" shall include but not limited to a system having A alone, B alone, C alone, A and B, A and C, B and C, and/or A, B, and C, etc.). Where expressions such as "at least one of A, B, or C" are used, they should generally be interpreted in accordance with the meaning commonly understood by those skilled in the art (for example, "a system having at least one of A, B, or C" shall include but not limited to a system having A alone, B alone, C alone, A and B, A and C, B and C, and/or A, B, and C, etc.) Those skilled in the art should also understand that any transition conjunction words and/or phrases indicating two or more optional items, regardless of appearance in the description, claims, or drawings, should be understood as providing possibilities of one of these items, either one of these items, or both of these items. For example, the phrase "A or B" should be understood to include the possibilities of "A" or "B", and "A and B".

Some block diagrams and/or flowcharts are shown in the drawings. It should be understood that some blocks or combinations of the blocks in the block diagrams and/or the flowcharts may be implemented by computer program instructions. These computer program instructions may be provided to a processor of a general purpose computer, special purpose computer, or other programmable data processing apparatus, so that when being executed by the processor, the instructions may create an apparatus to implement the functions/operations illustrated in the block diagrams and/or flowcharts.

Accordingly, the techniques disclosed in the present disclosure may be implemented in the form of hardware and/or software (including firmware, microcode, etc.). In addition, the disclosed technology of the present disclosure may take the form of a computer program product on a computer-readable medium storing instructions, and the computer program product may be used by or in conjunction with an instruction execution system. In the context of the present disclosure, a computer-readable medium may be any medium capable of containing, storing, sending, broadcasting, or transmitting instructions. For example, the computer-readable medium can include, but is not limited to, electrical, magnetic, optical, electromagnetic, infrared, or semiconductor system, apparatus, device, or propagation media. Specific examples of computer-readable medium include: magnetic storage devices such as magnetic tapes or hard disk drives (HDD); optical storage devices such as optical disks (CD-ROM); memories such as random access memory (RAM) or flash memory; and/or wired/wireless communication link.

Embodiment 1

This embodiment provides a control method. The method is applied to a processing apparatus. The processing apparatus may specifically be an image capturing apparatus, such as a camera, or a specific processing apparatus that includes the image capturing apparatus like electronic devices such as mobile phones and tablets. Here, the embodiment is explained by taking the processing apparatus as a camera as an example. In this embodiment, a special flash synchronization signal is added to a chip of the camera to control a turn-on time of a flash, shortening the turn-on time of the flash from about 200 ms to less than 10 ms, thereby achieving the purpose of shortening the flash ON time. Further, since the turn-on time of the flash is shortened in the embodiments, it can be determined based on the principle shown in FIG. 2 that, while shortening the turn-on time of the flash, the brightness of the flash is also increased in the embodiments, thereby avoiding the problem of uneven brightness caused by the flash being turned on for a long time, and laying the foundation for improving the user experience.

Figure 3:
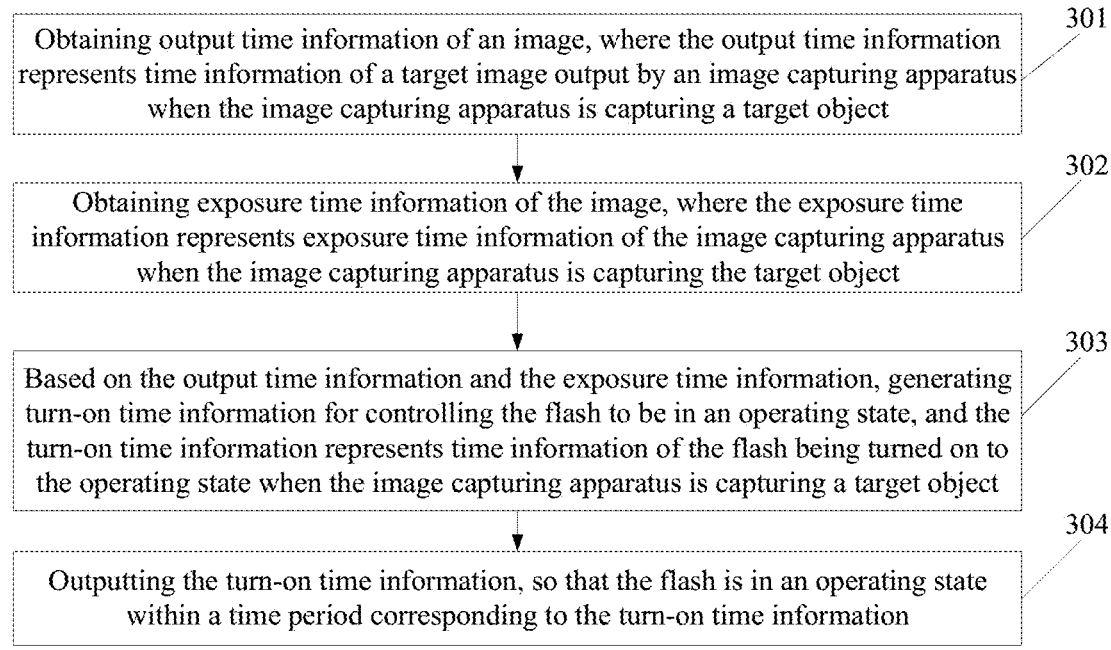
FIG. 3 schematically illustrates a flowchart of a control method according to an embodiment of the present disclosure.

FIG. 3 is a schematic flowchart of a control method according to an embodiment of the present disclosure. As shown in FIG. 3, the method includes:

Step 301: Obtaining output time information of an image, where the output time information represents time information of a target image output by an image capturing apparatus when the image capturing apparatus is capturing a target object.

Figure 4:
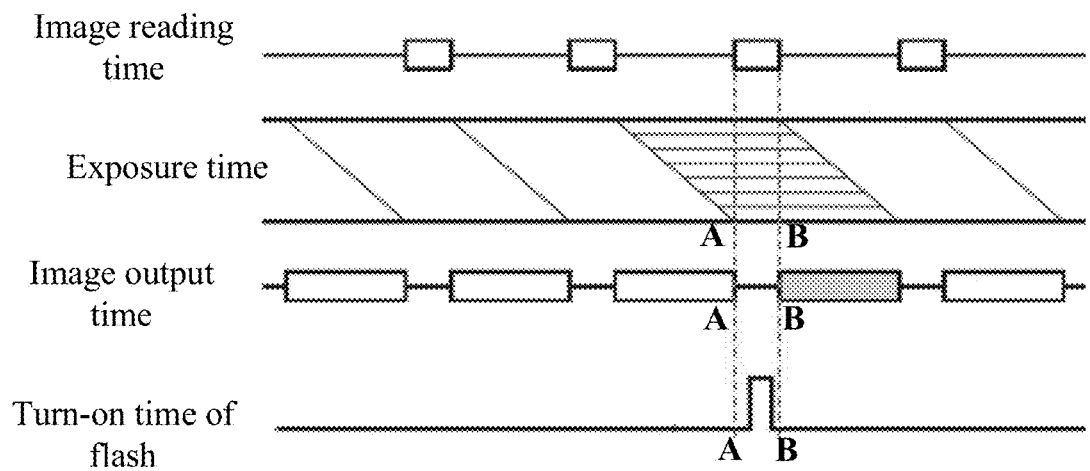
FIG. 4 schematically illustrates a timing diagram of controlling a flash using a control method according to an embodiment of the present disclosure.

Specifically, FIG. 4 is a timing diagram of controlling the flash using the control method provided in an embodiment of the present disclosure. The output time information, exposure time information, and turn-on time information described in the present disclosure are explained in further detail below with reference to FIG. 4.

According to an embodiment of the present disclosure, the output time information may specifically correspond to the image output time shown in FIG. 4. Further, as can be seen from the image output time of FIG. 4, the output time information may specifically include an output time of each image frame and an interval time when outputting two adjacent image frames. For example, the interval between the two points A and B is the interval time of outputting the two image frames.

Step 302: Obtaining exposure time information of the image, where the exposure time information represents exposure time information of the image capturing apparatus when the image capturing apparatus is capturing the target object.

Continuing to take FIG. 4 as an example, the exposure time information may specifically correspond to the exposure time shown in FIG. 4. As can be seen from the exposure time in FIG. 4, the exposure time information includes a time of starting to scan a first row until a time of finishing scanning a last row. According to the embodiment of the present disclosure, a content of one image frame is fully exposed during the exposure time between the two points A and B, that is, the exposure time between the two points A and B is specifically a time period from before finishing scanning a first row of the image frame until after start scanning a last row of the image frame. Only during this time period, the entire content of the image frame is fully exposed.

Step 303: Based on the output time information and the exposure time information, generating turn-on time information for controlling the flash to be in an operating state, and the turn-on time information represents time information of the flash being turned on to the operating state when the image capturing apparatus is capturing a target object.

According to an embodiment of the present disclosure, a time period corresponding to the turn-on time information may specifically be included a first time period of an interval between two adjacent target image frames included in the output time information. For example, the first time period may specifically be a time period between two points A and B corresponding to the output times shown in FIG. 4. Further, the time period corresponding to the turn-on time information may also be a second time period included in the exposure time information, from before finishing scanning a first row of the image frame until after start scanning a last row of the image frame. For example, the second time period may specifically be a time period between two points A and B corresponding to the exposure time shown in FIG. 4. That is, the turn-on time information is within a time period between two points A and B corresponding to the exposure time and a time period between two points A and B corresponding to the image output time.

According to an embodiment of the present disclosure, the time period between the two points A and B corresponding to the exposure time and the time period between the two points A and B corresponding to the output time may be the same (as shown in FIG. 4) or different. For example, the time period between the two points A and B corresponding to the output time is longer than the time period between the two points A and B corresponding to the exposure time, that is, the former is different from the latter, but the former includes the latter.

Step 304: outputting the turn-on time information, so that the flash is in an operating state within a time period corresponding to the turn-on time information.

According to an embodiment of the present disclosure, if the turn-on time of the flash becomes short, it is difficult to accurately control the flash by software means. Accordingly, the turn-on time information can be output in the following manner: a pulse signal of the turn-on time information is output through a pin of the image capturing apparatus, so that the flash is in an operating state within the time period corresponding to the turn-on time information. For example, a pin for controlling the flash can be added to the chip of the camera, and the pin for controlling the flash can be used to control the flash to be in an operating state within the time period corresponding to the turn-on time information, thereby solving the problem of unable to accurately control flash-on time using software caused by shortened turn-on time of the flash.

According to an embodiment of the present disclosure, when an image capturing apparatus is capturing a target object, the output time information of the image and the exposure time information of the image are used to determine the turn-on time information for controlling the flash to be in an operating state. Since the turn-on time information is determined based on the output time information and the exposure time information, the determined turn-on time information can be controlled to be within time periods corresponding to the output time information and the exposure time information, so as to lay a foundation for shortening the turn-on time of the flash, thereby avoiding the problem of uneven brightness caused by the flash being turned on for a long time, and enhancing the user experience.

Embodiment 2

Based on the method described in Embodiment 1, this embodiment provides a specific method for determining turn-on time information, that is, using a logic gate circuit to determine the turn-on time information. Specifically, the output time information and the exposure time information is input to a logic gate circuit of an image capturing apparatus, and the turn-on time information is then generated by the logic gate circuit.

According to an embodiment of the present disclosure, the logic gate circuit includes at least a logic AND gate. Correspondingly, the method for determining the turn-on time information may specifically include: inputting the exposure time information obtained from a photosensitive component to the logic AND gate, and inputting the output time information obtained from an image output interface to the logic AND gate; obtaining, using the logic AND gate circuit, a lesser one of the exposure time information and the output time information, to obtain a target time range that is within both a time period corresponding to the exposure time information and a time period corresponding to the output time information; and determining the turn-on time information from the target time range.

This embodiment is further described in detail with reference to FIG. 5 and FIG. 6.

Figure 5:
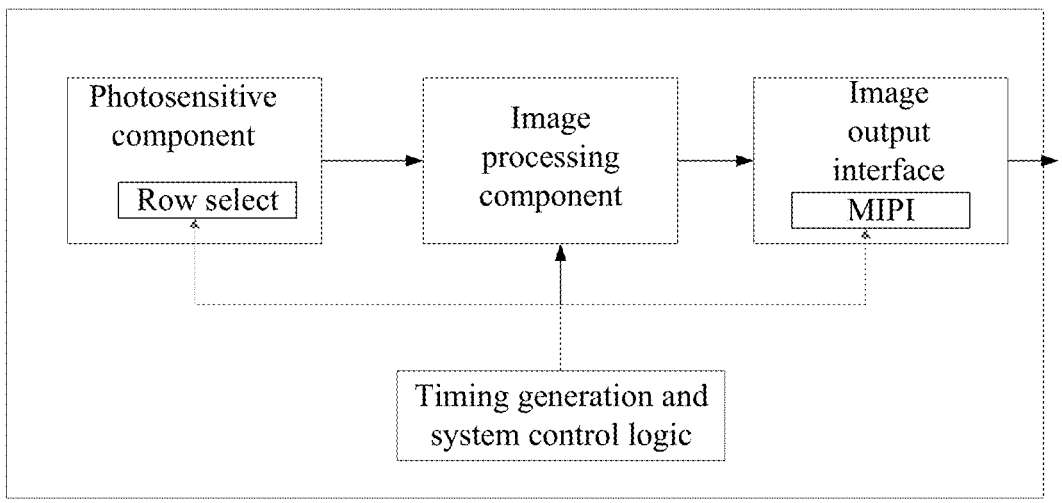
FIG. 5 schematically illustrates an internal structure diagram of a chip of an image capturing apparatus in prior art.

FIG. 5 is a schematic diagram of an internal structure of a chip of a conventional image capturing apparatus. As shown in FIG. 5, a chip of a conventional image capturing apparatus mainly includes a photosensitive component, i.e., an image sensor core, configured to convert a light signal into an electrical signal; an image processing component, i.e., an image sensor process, configured to temporarily store the electrical signal generated by the photosensitive component; an image output interface configured to output an image according to an MIPI output protocol.

Figure 6:
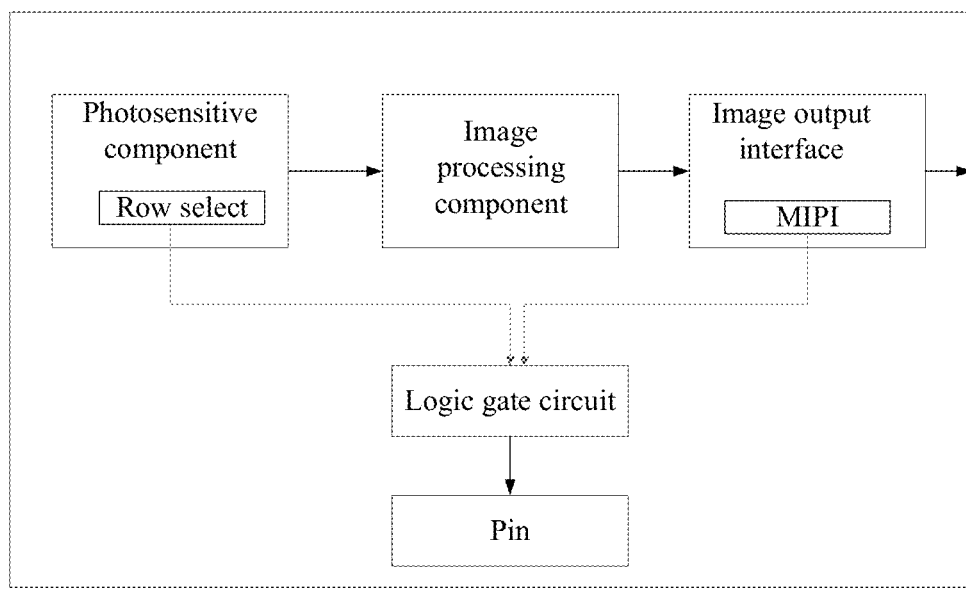
FIG. 6 schematically illustrates an internal structure diagram of a chip of an image capturing apparatus according to an embodiment of the present disclosure.

FIG. 6 is a schematic diagram of an internal structure of a chip of an image capturing apparatus according to an embodiment of the present disclosure. As can be seen by comparing FIG. 5 and FIG. 6, in this embodiment, a logic gate circuit and a pin are added to a chip of an existing image capturing apparatus, such as being added to a timing generation and system control logic. The logic gate circuit is configured to obtain the exposure time information from the Row select in the photosensitive component, and to obtain the output time information from the MIPI of the image output interface; obtain, from performing a logic operation by itself, the turn-on time information; and output, through a pin, the turn-on time information. In this way, the purpose of shortening the turn-on time of the flash is achieved, and because the turn-on time of the flash is determined based on the exposure time information, the entire contents of a target image are ensured to be fully exposed within the turn-on time of the flash.

According to an embodiment of the present disclosure, the logic gate circuit shown in FIG. 6 may specifically be a logic AND gate, that is, a time period included in both of and is a shorter one of the output time information and the exposure time information is identified, and the turn-on time information is obtained from the identified time period.

Embodiment 3

This embodiment provides a processing apparatus. The processing apparatus may specifically be an image capturing apparatus, such as a camera, or a specific processing apparatus that includes the image capturing apparatus like electronic devices such as mobile phones and tablets. Here, the embodiment is explained by taking the processing apparatus as a camera as an example. In this embodiment, a special flash synchronization signal is added to a chip of the camera to control a turn-on time of a flash, shortening the turn-on time of the flash from about 200 ms to less than 10 ms, thereby achieving the purpose of shortening the flash ON time. Further, since the turn-on time of the flash is shortened in the embodiments, it can be determined based on the principle shown in FIG. 2 that, in the embodiments while shortening the turn-on time of the flash, the brightness of the flash is also increased, thereby avoiding the problem of uneven brightness caused by the flash being turned on for a long time, and laying the foundation for improving the user experience.

Figure 7:
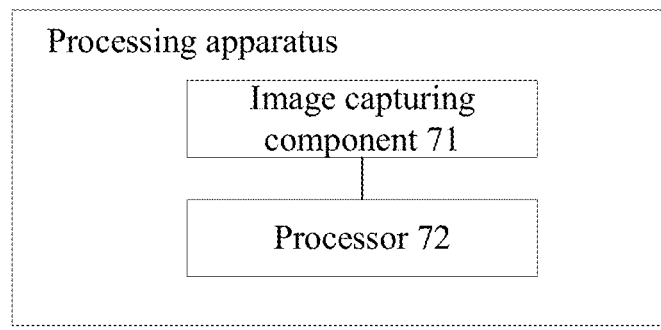
FIG. 7 schematically illustrates a structure diagram of a processing apparatus according to an embodiment of the present disclosure.

As shown in FIG. 7, the processing apparatus includes an image capturing component 71 and a processor 72.

The image capturing component 71 is configured to obtain output time information of an image, where the output time information represents information of output time of a target image output by an image capturing apparatus when the image capturing apparatus is capturing a target object; and obtain exposure time information of the image, where the exposure time information represents information of exposure time of the image capturing apparatus when the image capturing apparatus is capturing the target object.

The processor 72 is configured to, based on the output time information and the exposure time information, generate turn-on time information for controlling a flash to be in an operating state. The turn-on time information represents information of time to turn on the flash to the operating state when the image capturing apparatus is capturing a target object.

Correspondingly, the image capturing component 71 is further configured to output the turn-on time information, so that the flash is in an operating state within a time period corresponding to the turn-on time information.

Specifically, FIG. 4 is a timing diagram of controlling the flash using the control method provided in an embodiment of the present disclosure. The output time information, exposure time information, and turn-on time information described in the present disclosure are explained in further detail below with reference to FIG. 4.

According to an embodiment of the present disclosure, the output time information may specifically correspond to the image output time shown in FIG. 4. Further, as can be seen from the image output time of FIG. 4, the output time information may specifically include an output time of each image frame and an interval time when outputting two adjacent image frames. For example, the interval between the two points A and B is the interval time of outputting the two image frames.

Continuing to take FIG. 4 as an example, the exposure time information may specifically correspond to the exposure time shown in FIG. 4. As can be seen from the exposure time in FIG. 4, the exposure time information includes a time of starting to scan a first row until a time of finishing scanning a last row. According to the embodiment of the present disclosure, a content of one image frame is exposed fully during the exposure time between the two points A and B, that is, the exposure time between the two points A and B is specifically a time period from before finishing scanning a first row of the image frame until after start scanning a last row of the image frame. Only during this time period, the entire content of the image frame is fully exposed.

According to a specific embodiment, a time period corresponding to the turn-on time information may belong to a first time period of an interval between two adjacent target image frames and also belong to a second time period before an ending of a first row of an image frame to after a beginning of a last row of the image frame. For example, the first time period may specifically be a time period between two points A and B corresponding to the output times shown in FIG. 4, the second time period may specifically be a time period between two points A and B corresponding to the exposure time shown in FIG. 4. That is, the turn-on time information is within a time period between two points A and B corresponding to the exposure time and a time period between two points A and B corresponding to the image output time.

According to an embodiment of the present disclosure, the time period between the two points A and B corresponding to the exposure time and the time period between the two points A and B corresponding to the output time may be the same (as shown in FIG. 4) or different. For example, the time period between the two points A and B corresponding to the output time is longer than the time period between the two points A and B corresponding to the exposure time, that is, the former is different from the latter, but the former includes the latter.

According to an embodiment of the present disclosure, the processor 72 is further configured to enter the output time information and the exposure time information to a logic gate circuit of the image capturing apparatus, and generate the turn-on time information using the logic gate circuit.

According to an embodiment of the present disclosure, the logic gate circuit includes at least a logic AND gate. Correspondingly, the processor 72 is further configured to input the exposure time information obtained from a photosensitive component to the logic AND gate, and input the output time information obtained from an image output interface to the logic AND gate; obtain, using the logic AND gate circuit, a lesser one of the exposure time information and the output time information, to obtain a target time range that is within both a time period corresponding to the exposure time information and a time period corresponding to the output time information; and determine the turn-on time information from the target time range.

According to an embodiment of the present disclosure, if the turn-on time of the flash becomes short, it is difficult to accurately control the flash by software means. Accordingly, the turn-on time information can be output in the following manner, that is, the image capturing component 71 is further configured to output a pulse signal of the turn-on time information through a pin, so that the flash is in an operating state within the time period corresponding to the turn-on time information.

This embodiment is further described in detail with reference to FIG. 5 and FIG. 6.

FIG. 5 is a schematic diagram of an internal structure of a chip of a conventional image capturing apparatus. As shown in FIG. 5, a chip of a conventional image capturing apparatus mainly includes a photosensitive component, i.e., an image sensor core, configured to convert a light signal into an electrical signal; an image processing component, i.e., an image sensor process, configured to temporarily store the electrical signal generated by the photosensitive component; and an image output interface configured to output an image according to an MIPI output protocol.

FIG. 6 is a schematic diagram of an internal structure of a chip of an image capturing apparatus according to an embodiment of the present disclosure. As can be seen by comparing FIG. 5 and FIG. 6, in this embodiment, a logic gate circuit and a pin are added to a chip of an existing image capturing apparatus, such as being added to a timing generation and system control logic. The logic gate circuit is configured to obtain the exposure time information from the Row select in the photosensitive component, and to obtain the output time information from the MIPI of the image output interface; obtain, from performing a logic operation by itself, the turn-on time information; and output, through a pin, the turn-on time information. In this way, the purpose of shortening the turn-on time of the flash is achieved, and because the turn-on time of the flash is determined based on the exposure time information, the entire contents of a target image are ensured to be fully exposed within the turn-on time of the flash.

According to an embodiment of the present disclosure, the logic gate circuit shown in FIG. 6 may specifically be a logic AND gate, that is, a time period included in both of and is a shorter one of the output time information and the exposure time information is identified, and the turn-on time information is obtained from the identified time period.

According to an embodiment of the present disclosure, the image capturing component can be embedded into the processor, a processor embedded with an image capturing component can be realized by being configured to have a similar chip structure of image capturing apparatus as shown in FIG. 6.

According to an embodiment of the present disclosure, when an image capturing apparatus is capturing a target object, the output time information of the image and the exposure time information of the image are used to determine the turn-on time information for controlling the flash to be in an operating state. Since the turn-on time information is determined based on the output time information and the exposure time information, the determined turn-on time information can be controlled to be within time periods corresponding to the output time information and the exposure time information, so as to lay a foundation for shortening the turn-on time of the flash, thereby avoiding the problem of uneven brightness caused by the flash being turned on for a long time, and enhancing the user experience.

An embodiment of the present disclosure is directed to improvement of a processing chip of a camera module, limiting a time of turning on a flash to be within a first time period of an interval between two adjacent target images and within a second time period before finishing a first row and after beginning a last row of an image frame. Accordingly, compared with the prior art, the turn-on time of the flash can be decreased, thereby reducing power consumption. Meanwhile, the light provided by the flash in a short time is also most suitable for taking pictures is ensured. The technical problem of the prior art that the flash is on for a long time, the temperature increases, and the brightness decreases, is solved at least in part.

It may be understood that the image capturing component 71 and the processor 72 may be combined and implemented in one module, or any one of the modules may be split into multiple modules. Alternatively, at least part of the functions of one or more of these modules may be combined with at least part of the functions of other modules and implemented in one module. According to an embodiment of the present disclosure, at least one of the image capturing component 71 and the processor 72 may be implemented at least partially as a hardware circuit, such as a field programmable gate array (FPGA), a programmable logic array (PLA), a system on chip, a system on a substrate, a system on a package, an application-specific integrated circuit (ASIC), or implemented as a hardware or firmware capable of integrating or packaging a circuit in any other reasonable way, or implemented as a proper combination of software, hardware, and firmware. Alternatively, at least one of the image capturing component 71 and the processor 72 may be implemented at least partially as a computer program module, and when the program is run by a computer, the functions of the corresponding modules may be performed.

It should be noted here that the description of the foregoing embodiment of the electronic device is similar to the description of the method described above, and has the same beneficial effects as the method embodiment, so it will not be repeated here. For technical details that are not disclosed in the apparatus embodiments of the present disclosure, those skilled in the art can understand by referring to the description of the method embodiments of the present disclosure. To save space, they will not be repeated here.

The above-mentioned methods, apparatuses, units and/or modules according to embodiments of the present disclosure may be implemented by a computing-capable electronic device executing a software containing computer instructions. A system may include storage devices to implement the various storing functions described above. The electronic device capable of computing may include apparatus(es) capable of executing computer instructions, such as a general-purpose processor, a digital signal processor, a special-purpose processor, and a reconfigurable processor, but is not limited thereto. Executing such instructions causes the electronic device to be configured to perform the above-described operations according to the present disclosure. The foregoing devices and/or modules may be implemented in one electronic device, or may be implemented in different electronic devices. These software may be stored on a computer-readable storage medium. The computer-readable storage medium stores one or more programs (software modules), the one or more programs including instructions that, when being executed by one or more processors in an electronic device, cause the electronic device to execute the method provided in the present disclosure.

The software may be stored in the form of volatile memory or non-volatile storage apparatus (e.g., a storage device like ROM), whether erasable or rewritable, or stored in the form of memory (e.g., RAM, memory chips, devices, or integrated circuits), or stored on optically or magnetically readable media (e.g., CDs, DVDs, disks, or tapes, etc.). It should be appreciated that storage devices and storage media are embodiments of a machine-readable storage apparatus suitable for storing one or more programs, the one or more programs including instructions that, when being executed, implement the embodiments of the present disclosure. Embodiments provide programs and a machine-readable storage device storing such programs, the programs including code for implementing a device or method according to any one of the claims of the present disclosure. In addition, these programs can be transmitted via any medium (e.g., a communication signal carried via a wired connection or a wireless connection), and various embodiments include these programs as appropriate.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit. The integrated units can be implemented in the form of hardware or software functional units.

Those of ordinary skill in the art may understand that all or part of the steps of implementing the foregoing method embodiments may be completed by a program instructing related hardware. The program may be stored in a computer-readable storage medium. When the program is executed, the steps of the above method embodiments can be executed. The storage medium includes various types of storage devices capable of storing program codes, such as a mobile storage device, a Read Only Memory (ROM), a Random Access Memory (RAM), a magnetic disk or an optical disk.

Alternatively, the integrated units in the present disclosure can be implemented in the form of software functional modules and stored in a non-transitory computer-readable storage medium, which can be sold or used as a standalone product. Based on this understanding, the technical solutions of the embodiments of the present disclosure that are essential or contribute to related technologies or part of the technical solutions can be embodied in the form of software products. The computer software product is stored in a storage medium and includes several instructions that cause a computing device (which may be a personal computer, a server, or a network device, etc.) to execute all or part of the steps of the methods described in various embodiments of the present disclosure. The storage medium include various types of media that can store program codes, such as a Read Only Memory (ROM), a Random Access Memory (RAM), a magnetic disk or an optical disk.

The above are only specific embodiments of the present disclosure, but the scope of the present disclosure is not limited to this. Modifications or replacements made by those skilled in the art within the technical scope of the present disclosure without inventive effort should fall within the protection scope of the present disclosure. It should be covered by the protection scope of the present invention. Therefore, a true scope and spirit of the disclosure is based on the following claims.

What is claimed is:

1. A method, comprising:
    obtaining an output time of an image being taken by an image capturing apparatus;
    obtaining an exposure time of the image being taken by the image capturing apparatus; and
    based on the output time and the exposure time, controlling a turn-on time of a flash corresponding to the image being taken by the image capturing apparatus, comprising:
        inputting the output time obtained from a photosensitive component to a logic gate circuit, and inputting the exposure time obtained from an image output interface to the logic gate circuit;
        identifying, by using the logic gate circuit, a shorter one of a time period corresponding to the exposure time and a time period corresponding to the output time as a target time range; and
        determining the turn-on time of the flash from the target time range.

2. The method according to claim 1, wherein:
    a time period corresponding to the turn-on time of the flash is within a first time period of an interval between the image and an image frame adjacent to the image, and within a second time period from before an ending of exposing a first row of the image to after a beginning of exposing a last row of the image.

3. The method according to claim 1, wherein the logic gate circuit includes at least a logic AND gate.

4. The method according to claim 1, wherein controlling the turn-on time of the flash comprises:
    outputting a pulse signal corresponding to the turn-on time using a pin of the image capturing apparatus.

5. The method according to claim 1, further comprising:
    connecting a first input terminal of the logic gate circuit to the photosensitive component of the image capturing apparatus, to obtain the exposure time;
    connecting a second input terminal of the logic gate circuit to the image output interface of the image capturing apparatus, to obtain the output time; and
    connecting an output terminal of the logic gate circuit to a timing generation and system control logic of the image capturing apparatus, to control the turn-on time of the flash.

6. The method according to claim 5, wherein the logic gate circuit is added to a chip of the image capturing apparatus.

7. An apparatus, comprising:
    an image capturing component, configured to obtain an output time of an image being taken by an image capturing apparatus; and obtain an exposure time of the image being taken by the image capturing apparatus; and
    a processor configured to: based on the output time and the exposure time, control a turn-on time of a flash corresponding to the image being taken by the image capturing apparatus, comprising:
        inputting the output time obtained from a photosensitive component to a logic gate circuit, and inputting the exposure time obtained from an image output interface to the logic gate circuit;
        identifying, by using the logic gate circuit, a shorter one of a time period corresponding to the exposure time and a time period corresponding to the output time as a target time range; and
        determining the turn-on time of the flash from the target time range.

8. The apparatus according to claim 7, wherein:
    a time period corresponding to the turn-on time of the flash is within a first time period of an interval between the image and an image frame adjacent to the image, and within a second time period from before an ending of exposing a first row of the image to after a beginning of exposing a last row of the image.

9. The apparatus according to claim 7, wherein the logic gate circuit includes at least a logic AND gate.

10. The apparatus according to claim 7, wherein the image capturing component is further configured to:
    output a pulse signal corresponding to the turn-on time using a pin of the image capturing apparatus.

11. The apparatus according to claim 7, wherein:
    a first input terminal of the logic gate circuit is connected to the photosensitive component of the image capturing apparatus, to obtain the exposure time;
    a second input terminal of the logic gate circuit is connected to the image output interface of the image capturing apparatus, to obtain the output time; and
    an output terminal of the logic gate circuit is connected to a timing generation and system control logic of the image capturing apparatus, to control the turn-on time of the flash.

12. The apparatus according to claim 11, wherein the logic gate circuit is added to a chip of the image capturing apparatus.

13. An image capturing apparatus, comprising:
    an image output interface configured to generate an output time of an image being taken by the image capturing apparatus;
    a photosensitive component configured to generate an exposure time of the image being taken by the image capturing apparatus;
    a flash configured to operate based on a turn-on time corresponding to the image being taken; and
    a logic gate circuit configured to: obtain the output time from a photo sensitive component and the exposure time from the image output interface; identify a shorter one of a time period corresponding to the exposure time and a time period corresponding to the output time as a target time range, and generate the turn-on time of the flash from the target time range.

14. The apparatus according to claim 13, wherein:
    a time period corresponding to the turn-on time of the flash is within a first time period of an interval between the image and an image frame adjacent to the image, and within a second time period from before an ending of exposing a first row of the image to after a beginning of exposing a last row of the image.

15. The apparatus according to claim 13, wherein: the logic gate circuit includes at least a logic AND gate.

16. The apparatus according to claim 13, wherein the logic gate circuit is further configured to:

output a pulse signal corresponding to the turn-on time using a pin.

17. The apparatus according to claim 16, further comprising:
a timing generation and system control logic configured to control the turn-on time of the flash based on the pulse signal.

18. The apparatus according to claim 17, wherein:
the pin used to output the pulse control signal is a pin of the timing generation and system control logic.

* * * * *